UNITED STATES PATENT OFFICE.

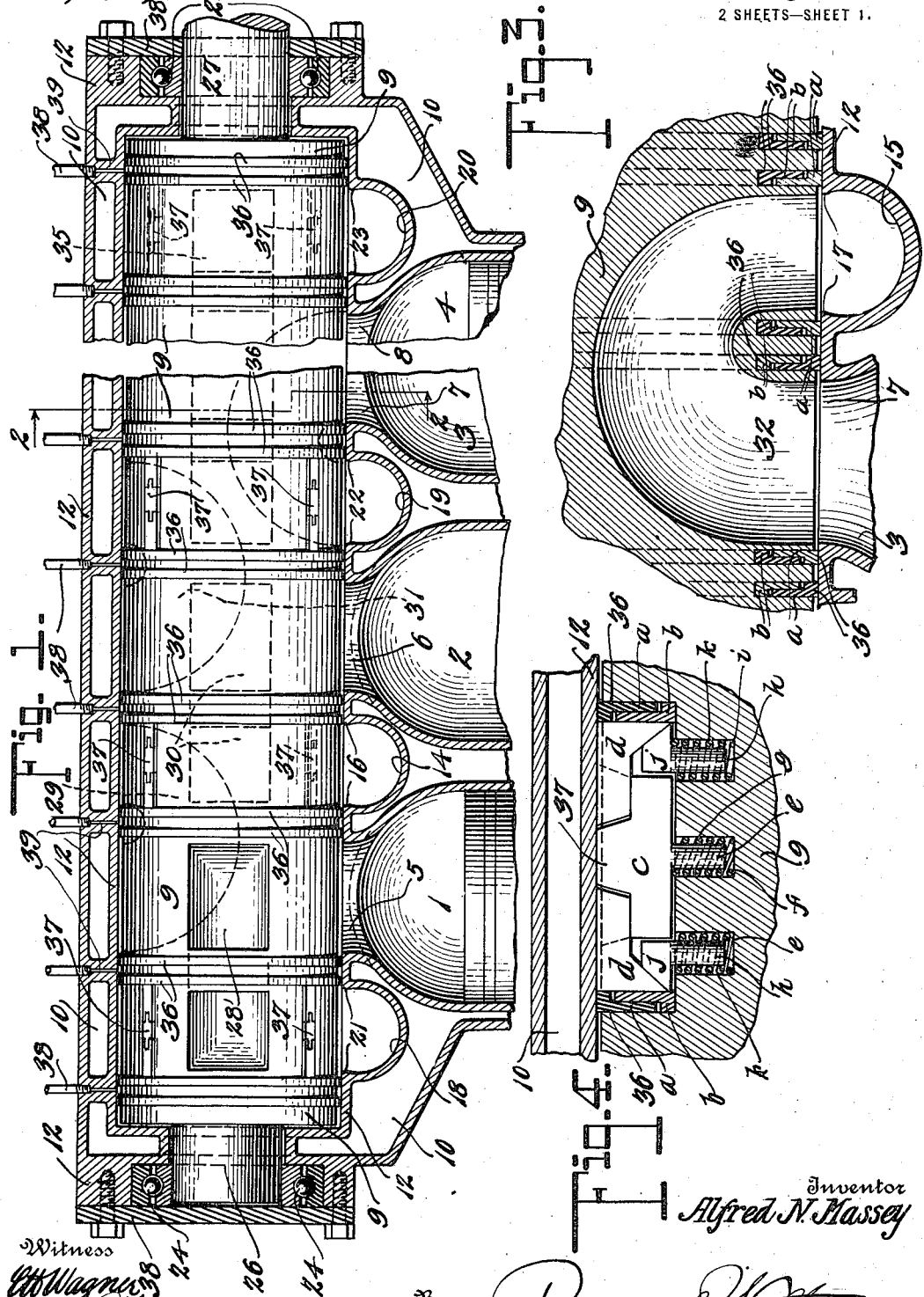

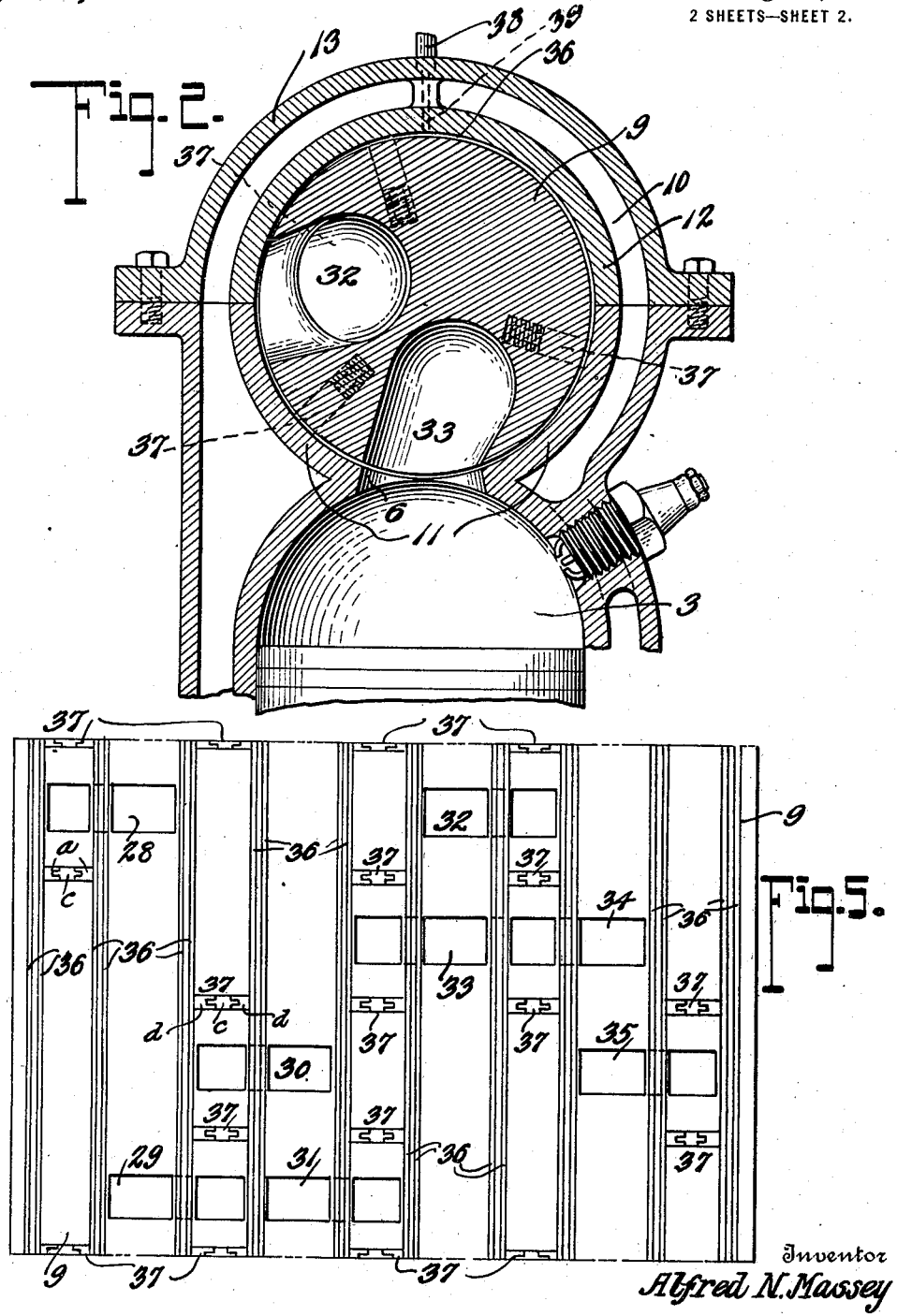

ALFRED N. MASSEY, OF SAN FRANCISCO, CALIFORNIA.

ROTARY VALVE FOR INTERNAL-COMBUSTION ENGINES.

1,276,242.

Specification of Letters Patent.

Patented Aug. 20, 1918.

Application filed February 21, 1917. Serial No. 150,160.

*To all whom it may concern:*

Be it known that I, ALFRED N. MASSEY, a citizen of the United States, residing at San Francisco, in the county of San Francisco and State of California, have invented certain new and useful Improvements in Rotary Valves for Internal-Combustion Engines, of which the following is a specification.

The present invention relates to internal combustion engines and is chiefly concerned with improvements in rotary valves of the type shown and described in applicant's copending application, Serial Number 78,281, for said engines.

Applicant is aware that a single valve member has been heretofore provided for controlling the inlet and exhaust to and from the engine cylinders, and is also aware that these valves are fittedly seated in the valve casing on the ports of the cylinder with the view of providing a tight joint for preventing leakage around the valve. Where gaskets or packing rings have been used they have never, according to applicant's knowledge, been the sole means for restricting the flow of the gases or for preventing leakage of the gases around the valve or between its various ports.

The primary object of this invention is to provide a clearance or space between the rotary valve and its casing in order that the valve may readily expand or contract according to heat conditions without binding at any points, and to positively and definitely restrict the flow of the gases through and around the periphery of the valve despite the clearance between the valve and the valve casing.

Other objects of the invention are to provide a simpler valve arrangement so constructed as will permit exceedingly large ports in the cylinder and which will reduce the number of actuating ports of a motor, and to provide a valve which is efficient, positive and silent in operation.

The features of the invention reside in the provision of a single rotary valve member extended transversely across the cylinder or cylinders of a gas engine and so rotatably journaled as to be held spaced from the inner wall of a valve casing; and in the provision of circumferentially and longitudinally extending packing members on the periphery of valve to engage with the inner wall of the valve casing and so arranged as to positively prevent the escape or leakage of the gases between the various ports, and which are further arranged to allow the compressed gases to exert an equal pressure all around the valve member at points directly over each cylinder of the engine, whereby distortion and binding of the valve is obviated.

The invention also further consists in the novel construction of packing members and in the general construction and organization of parts which will be later referred to as the detail description proceeds and will be finally pointed out in the appended claims.

In the drawings which illustrate the invention:

Figure 1 is a longitudinal, vertical sectional view through the upper portion of a gas engine equipped with the present invention.

Fig. 2 is a transverse sectional view taken substantially on line 2—2 of Fig. 1.

Fig. 3 is a fragmentary sectional view taken through the valve member to illustrate the port communicating passages therein and the arrangement of the circumferential packing rings.

Fig. 4 is a fragmentary sectional view illustrating the construction of the longitudinal packing members, and Fig. 5 is an expanded view of the surface of the valve showing the disposition of the ports and the circumferential and longitudinal packing members.

Like reference characters denote similar and like parts throughout the specification and drawings.

The drawings illustrate a four cylinder engine. However, the invention is applicable to engines having any number of cylinders and functions in the same manner. The cylinders 1, 2, 3 and 4, here shown, are each provided with pistons and with a port 5, 6, 7 and 8, respectively, at their upper end portions, which ports are each intermittently opened and closed by the rotary valve member 9 for alternately supplying and exhausting a cylinder. The cylinders may be provided with the usual water jacket 10.

The head of the cylinders of the engine are so constructed as to form a lower section 11 of the valve chamber 12 which further consists of a removable complemental top section 13. (Fig. 2). As is clear from the drawings, the valve chamber extends transversely across the upper ends of the cylinders and, preferably, parallel to the crank shaft of the engine.

The upper part of the cylinder casing has gas inlet passages 14 and 15 connected to a source of gas supply and has gas inlet ports 16 and 17 opening through the lower valve chamber section preferably between cylinders 1 and 2, and between cylinders 3 and 4, respectively, the intake port 17 not being shown in Fig. 1. Similar exhaust passages 18, 19 and 20 are provided in the cylinder casing and have similar exhaust ports 21, 22 and 23, port 22 being preferably arranged between cylinders 2 and 3, and ports 21 and 23 being arranged at opposite ends of the motor, respectively. By this arrangement of ports, it will be seen that only two inlet ports and three exhaust ports are necessary in a four cylinder engine, as intake 16 supplies cylinders 1 and 2 and intake 17, (see Fig. 3) will supply cylinders 3 and 4, while exhaust port 22 will serve cylinders 2 and 3 and exhaust ports 21 and 23 will serve cylinders 1 and 4, respectively.

At the opposite ends of the valve chamber are suitable bearings 24 and 25 to receive the trunnions or ends 26 and 27 of a shaft projecting from opposite ends of the valve member 9. The bearings solely support the valve member and hold the same in position so that there will be at all times a clearance or space between the circumferential surface of valve member and inner wall of the valve chamber.

The valve member 9 may be either solid or hollow, but is preferably solid; in either case, however, it is formed with a plurality of passages 28, 29, 30, 31, 32, 33, 34 and 35 therein for intermittently and alternately opening communication between the intakes 16 and 17 and the cylinders and between the exhaust ports 21, 22 and 23 and the cylinders according to a predetermined timing. As will be clearly understood from Fig. 5, passages 29 and 30 will connect cylinders 1 and 2, respectively, with the intake 16; passages 32 and 34 will connect cylinders 3 and 4, respectively, with intake 17; passages 31 and 33 will connect cylinders 2 and 3, respectively, with exhaust port 22; and passages 28 and 35 will connect cylinders 1 and 4 with exhaust ports 21 and 23, respectively.

No attempt is made to close the ports in the cylinders with the valve itself, but by compression or packing rings and longitudinal packing members or keys. To prevent the escape or leakage of gas between the various ports by passing between the valve 9 and the walls of the valve chamber, a plurality of packing rings 36 are seated in grooves in the periphery of the valve member and are arranged in pairs between the ports in the cylinders and their respective inlet and exhaust ports as will be clear from the drawings especially Fig. 5. These rings 36 are adapted to constantly compress or tightly engage the wall of the valve chamber and each consists of two complemental annular members $a$ and $b$ one of greater diameter than the other and each having an overlapping reduced portion to permit the ring to be extended or compressed. The inner member $b$ of the rings is preferably, tuned from a piece of metal slightly smaller than the seat of the groove in order to make it fit the valve tightly when in position. By this construction, the outer member $a$ of the rings will remain substantially stationary against the walls of the valve chamber while the inner member will revolve with the valve, thus placing the wear on the inner member of the rings.

Longitudinal packing members or keys 37 are disposed in suitable grooves in the periphery of the valve and adjacent opposite sides of that end of the passages 28, 29, 30, 31, 32, 33, 34 and 35 which registers with the ports 16, 17, 21, 22 and 23, thus preventing the gas from passing around the periphery of those portions of the valve lying over said ports; although those portions of the valve over-lying the ports 5, 6, 7 and 8 are free of the longitudinal keys so that the gas during combustion and compression may exert an equal pressure on all sides of the valve to prevent binding or distortion of the valve, as shown in Fig. 2.

The keys 37 each consists of a central member $c$ having end members $d$ slidably mounted thereon to have a movement longitudinally of the central member, which has a stud $e$ projecting into a recess $f$ in the bottom of the groove in which said keys are seated. A spring $g$ surrounds the stud $e$ and normally tends to move the key outwardly into engagement with the wall of the valve chamber. Pins $h$ are also disposed in recesses $i$ in the bottom of the key groove and have enlarged beveled heads $j$ engageable with a corresponding beveled portion on the end members $d$; and, since spring $k$ surrounding the pins normally tends to move the latter outwardly, the end members $d$ are held in abutting engagement with the rings 36, as shown in Fig. 4, to form a tight joint. It will be seen that by this construction of key the latter are self adjusting to condition especially those caused by wear.

The ends of the valve casing 12 are closed by the removable plates 38, which as here shown retain the ball bearings 24 and 25 in position.

It is, also, contemplated by this invention to lubricate the valve 9 and, in this instance, there is shown oil ducts 39 extending through the wall of the valve chamber and having connection with suitable supply pipes 40. These ducts 39 are arranged to discharge the oil between the rings of each pair of circumferential rings 36.

The foregoing describes my invention, however, certain changes in the construction and organization of various parts may be made that will be within the legitimate scope of the appended claims.

What is claimed is:

1. The combination with an engine cylinder, a valve chamber in communication with the cylinder, intake and exhaust ports communicating with said chamber, a rotary valve disposed in the valve chamber and having its face spaced from the walls of the chamber to provide a clearance, packing means on the valve face between said ports and the port of the cylinder for preventing the passage of gas between said ports and cylinder and permitting pressure from the cylinder to be exerted equally on all sides of the valve of that portion over the cylinder port, said valve having passages therein for connecting said ports and cylinder, and other packing means for preventing the passage of gas between said ports and passages except when the latter are registering with the ports.

2. The combination of an engine cylinder, a valve chamber in communication with the cylinder, intake and exhaust ports communicating with the chamber, a rotary valve disposed in the valve chamber and having its face spaced from the walls of the chamber to provide a clearance, packing rings on the valve and arranged to lie between said ports and the port of the cylinder for solely preventing leakage of gas between the ports, said valve having passages for communicating said ports with the cylinder and means for preventing the passage of gas between said ports and passages except when the latter are in registration.

3. The combination of an engine cylinder, a valve chamber in communication with the cylinder, intake and exhaust ports communicating with the chamber, a rotary valve disposed in the valve chamber and having its face spaced from the walls of the chamber to provide a clearance, circumferential packing rings on the valve and arranged to lie between said ports and the port of the cylinder for solely preventing leakage of gas between the ports, said valve having passages for communicating said ports with the cylinder, and packing members extending longitudinally of the valve and arranged between the packing rings defining the area of the valve over the intake and exhaust ports for preventing the passage of gas between said ports and passages except when the latter are registering with the ports.

4. A rotary valve comprising a cylindrical member, a plurality of circumferential packing members arranged on the face of the valve in spaced relation, said valve having a plurality of passages therein extending from the surface of the valve between certain of the packing members to the surface of the valve between other packing members, and packing members extending longitudinally of the valve between certain of the first packing members.

5. A rotary valve comprising a cylindrical valve member having a plurality of circumferential packing members arranged on the face thereof in spaced relation, said valve having passages therein extending from the surface of the valve between certain of the packing members to adjacent surfaces of the valve defined by other of said packing members, and other packing members extending longitudinally of the valve between certain of the first packing members and adjacent the edges of said passages.

6. A rotary valve comprising a cylindrical member, a plurality of circumferential packing members arranged on the face of the valve in spaced relation, said valve having a plurality of passages therein extending from the surface of the valve between certain of the packing members to the surface of the valve between other packing members, packing members extending longitudinally of the valve between certain of the first packing members, and trunnions at the ends of valve member.

7. A rotary valve member having a circumferential packing member seated in a groove in the face of the valve, said packing member comprising an inner and outer ring of substantially L-shaped in cross-section, said rings being adapted to move relatively to each other.

8. A rotary valve having circumferential packing members thereon, other packing members extending longitudinally of the valve between certain of said first packing members, said second packing members each comprising a main body having end portions movable thereon, means tending to move said body and end portions outwardly from the valve, and means tending to move said end portions laterally relatively to said body.

9. A rotary valve member having circumferential packing members thereon, each comprising an inner and an outer ring movable relative to each other, and other packing members extending longitudinally of the valve between certain of said first packing members.

10. The combination of a grooved body, a packing member mounted in said groove and comprising a main body portion having extensible end portions, means tending to move said body and end portions outwardly from the groove, and means tending to move said end portions laterally relatively to said main body portion.

11. The combination of a grooved body, a packing member mounted in said groove and comprising a main body portion having end portions movable thereon, means tending to move said main body and end portions outwardly from the groove, and wedge members normally tending to move said end portions laterally relatively to said main body portion.

12. In combination, a valve chamber, a valve member rotatably mounted in said chamber, and circumferential packing members arranged in groups on said valve member and being spaced relative to each other, said valve chamber having passages therethrough admitting lubricant to the surface of the valve between the packing members of each group.

In testimony whereof I affix my signature in the presence of two witnesses.

ALFRED N. MASSEY.

Witnesses:
ROBERT BILAFER,
J. B. BILAFER.

Copies of this patent may be obtained for five cents each, by addressing the "Commissioner of Patents Washington, D. C."